(12) United States Patent
Rönnebro et al.

(10) Patent No.: US 8,147,788 B1
(45) Date of Patent: *Apr. 3, 2012

(54) DIRECT SYNTHESIS OF MAGNESIUM BOROHYDRIDE

(75) Inventors: Ewa Carin Ellinor Rönnebro, Kennewick, WA (US); Godwin Severa, Honolulu, HI (US); Craig M. Jensen, Kailua, HI (US)

(73) Assignee: Sandia Corporation, Livermore, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/553,633

(22) Filed: Sep. 3, 2009

Related U.S. Application Data

(63) Continuation-in-part of application No. 11/807,012, filed on May 24, 2007, now Pat. No. 7,608,233.

(51) Int. Cl.
  C01B 6/13 (2006.01)
  C01B 6/24 (2006.01)
  C01B 6/00 (2006.01)
  C01B 6/04 (2006.01)
  C01B 3/02 (2006.01)
  C01B 3/08 (2006.01)

(52) U.S. Cl. ........ 423/286; 423/644; 423/645; 423/646; 423/648.1; 423/658.2

(58) Field of Classification Search .................. None
See application file for complete search history.

(56) References Cited

U.S. PATENT DOCUMENTS
6,251,349 B1 * 6/2001 Zaluska et al. ............... 423/286

FOREIGN PATENT DOCUMENTS
WO    WO 2005091765 A2 * 10/2005

OTHER PUBLICATIONS
Bormann et al.; Formation of Ca(BH4)2 from hydrogenation of CaH2 + MgB2 Composite; J. Phys. Chem. C; 112, 2743-2749; 2008.*

* cited by examiner

*Primary Examiner* — Melvin Mayes
*Assistant Examiner* — Guinever Gregorio
(74) *Attorney, Agent, or Firm* — Timothy Evans

(57) ABSTRACT

A method is disclosed for directly preparing an alkaline earth metal borohydride, i.e. $Mg(BH_4)_2$, from the alkaline earth metal boride $MgB_2$ by hydrogenating the $MgB_2$ at an elevated temperature and pressure. The boride may also be doped with small amounts of a metal chloride catalyst such as $TiCl_3$ and/or $NiCl_2$. The process provides for charging $MgB_2$ with high pressure hydrogen above at least 70 MPa while simultaneously heating the material to about 350° C. to about 400° C. The method is relatively simple and inexpensive and provides a reversible hydride compound having a hydrogen capacity of at least 11 wt %.

10 Claims, 3 Drawing Sheets

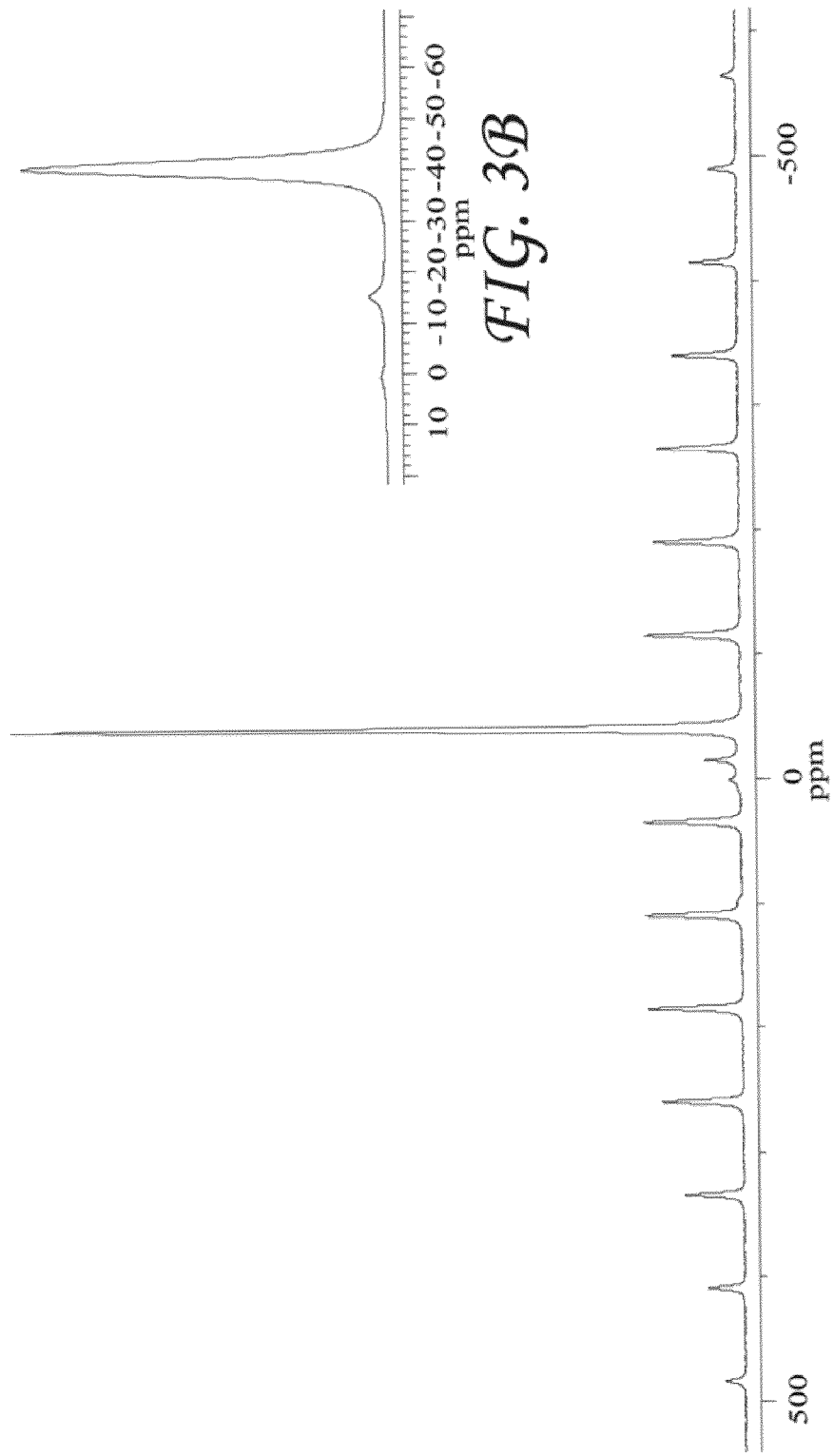

DIRECT SYNTHESIS OF MAGNESIUM BOROHYDRIDE

CROSS REFERENCE TO RELATED APPLICATIONS

This application is a continuation-in-part of prior U.S. patent application Ser. No. 11/807,012 originally filed May 24, 2007 now U.S. Pat. No. 7,608,233 entitled "Direct Synthesis of Calcium Borohydride" from which benefit is claimed.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

PARTIES TO A JOINT RESEARCH AGREEMENT

The invention claimed herein was made as a result of activities undertaken within the scope of a joint research agreement initiated by the U.S. Department of Energy to establish a Metal Hydride Center of Excellence by and between Sandia National Laboratories and several other partners on Oct. 1, 2004 including Brookhaven National Laboratory (BNL); California Institute of Technology; Carnegie Mellon University; General Electric—Global Research: HRL, LLC; Internatix Corporation; the Jet Propulsion Laboratory (JPL); the National Institute of Standards and Technology (NIST); Oak Ridge National Laboratory (ORNL); Savannah River National Laboratory (SRNL); Stanford University; the University of Hawaii; the University of Illinois at Urbana-Champaign; the University of Nevada, Reno; the University of Pittsburgh; and the University of Utah.

TECHNICAL FIELD

This invention relates to a method of directly synthesizing an alkaline earth metal borohydride compound. More particularly, this present invention relates to a method for directly producing magnesium borohydride.

BACKGROUND

As the cost of energy continues to soar, increasing interest is directed toward the development of new sources of fuels. The continuing and ever increasing consumption of fossil resources is of particular concern due both to the consequences of increased global demand for dwindling reserves of easily obtained petroleum oil and the continuing and growing threat of global warming. In particular, the amount of petroleum oil refined and burned as gasoline in order to fuel automobiles in this country and the amount of natural gas, coal and petroleum fuel for central electric power-generating stations continues to increase with no end in sight. An alternative fuel for either or both of these applications is especially desired in view of the amounts of resources consumed and the amount of greenhouse gases generated annually as a result of converting these fuels into energy through combustion.

One possible and very attractive alternative fuel is hydrogen since it produces only water vapor as a byproduct when burned. However, storage of hydrogen for automotive applications is problematic. Storage of hydrogen as a metal hydride has been extensively investigated for at least the last 40 years. Unfortunately, because of thermodynamic and kinetic constraints, the essential properties needed for a hydride storage material (high hydrogen capacity, low reaction enthalpy, reversibility and low desorption temperature) are very difficult to satisfy simultaneously.

Simple binary hydride compounds, such magnesium hydride ($MgH_2$), have shown promise in that it exhibits good hydrogen reversibility, fast reaction kinetics, and a relatively high hydrogen capacity (7.6 wt %). Unfortunately, $MgH_2$ reaches a hydrogen equilibrium pressure of 1 bar at a temperature of 300° C., a temperature well above what is believed to be an operating temperature upper limit of about 120° C. for automobile applications.

In order to overcome this shortcoming, several complex metal hydride compounds have been investigated such as alanates and borohydride compounds, particularly calcium borohydride, as disclosed in commonly owned and co-pending U.S. application Ser. No. 11/807,012. Also of interest is magnesium borohydride. This application describes a new direct solid state route to synthesize $Mg(BH_4)_2$ from $MgB_2$.

Recently, it was shown that it is possible to prepare calcium borohydride by a new solid-state synthesis route, i.e., $CaB_6$ (s)+$2CaH_2$ (s)+$10H_2$ (g)→$3Ca(BH_4)_2$ (s) and that addition of a dopant is necessary for formation of this compound (cf. E. Rönnebro, E. Majzoub, "Calcium Borohydride for Hydrogen Storage: Catalysis and Reversibility", *Journal of Physical Chemistry B Letters*, 2007, v. 111: pp. 12045; U.S. patent application Ser. No. 11/807,012 filed May 24, 2007, both herein incorporated by reference). What is unique with the present approach is that the starting materials are decomposition products upon release of hydrogen when the material is heated, thus this reaction implies a high-capacity reversible hydrogen storage system. It has recently been shown that $Mg(BH_4)_2$ decomposes through a series of intermediated species (see Son-Jong Hwang, Robert C. Bowman, Jr., Joseph W. Reiter, Job Rijssenbeek, Grigorii L. Soloveichik, Ji-Cheng Zhao, Houria Kabbour, and Channing C. Ahn, *Journal of Physical Chemistry C Letters*, 2008, v. 112(9): pp. 3164-3169), until all hydrogen is released to form $MgB_2$, i.e.,

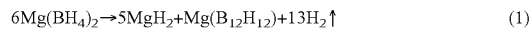
$$6Mg(BH_4)_2 \rightarrow 5MgH_2 + Mg(B_{12}H_{12}) + 13H_2 \uparrow \quad (1)$$

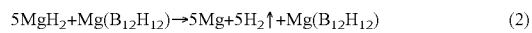
$$5MgH_2 + Mg(B_{12}H_{12}) \rightarrow 5Mg + 5H_2 \uparrow + Mg(B_{12}H_{12}) \quad (2)$$

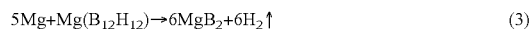
$$5Mg + Mg(B_{12}H_{12}) \rightarrow 6MgB_2 + 6H_2 \uparrow \quad (3)$$

Thus we are here preparing $Mg(BH_4)_2$ from its decomposition product in order to show feasibility for application as a reversible storage material with a capacity of 14 wt % hydrogen.

Another direct synthesis route of $Mg(BH_4)_2$ from magnesium, boron and hydrogen at 923K and 15 MPa of hydrogen was reported by Goerrig (cf. German Patent DE 1,077,644, Dec. 27, 1958).

SUMMARY

In an embodiment of the present invention, there is provided a process for direct synthesis of magnesium borohydride.

Therefore, in accordance with one aspect of the invention there is provided a method of producing magnesium borohydride from $MgB_2$ by high pressure hydrogenation.

In another aspect of this invention, there is provided a method for preparing magnesium borohydride, wherein the step of high pressure hydrogenation comprises high pressure hydrogenation of compacted powders at an elevated temperature.

In a further aspect of this invention, the first step of the method is performed with dry powders, i.e. without a solvent or any other suspension aid. The method is further accomplished by optionally subjecting the reagent materials to a milling means in a dry, inert atmosphere such as argon in order to reduce the materials to a powdered form.

In still another aspect of the invention, the milled powders may be optionally compacted into one or more pressed pellets.

In yet another aspect of the invention, the milled powders are subjected to high pressure hydrogen gas between about 700 bars (70 MPa) to about 1000 bars (100 MPa) at a temperature of about 350° C. to about 400° C.

Both the foregoing general description and the following detailed description are exemplary and explanatory only and are intended to provide further explanation of the invention as claimed. Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention.

FIG. 3A shows a $^{11}B$ magic angle spinning-nuclear magnetic resonance ($^{11}B$ MAS-NMR) spectrum of $MgB_2$ after having been processed under 950 bars (95 MPa) of hydrogen at 400° C. to provide $Mg(BH_4)_2$.

FIG. 3B shows an expanded view of the $^{11}B$ MAS-NMR spectrum shown in FIG. 3A. The major peak at −41 ppm corresponds to $Mg(BH_4)_2$ while the much smaller peak at −15 ppm corresponds to $MgB_{12}H_{12}$.

DETAILED DESCRIPTION OF THE EMBODIMENTS OF THE INVENTION

Figure 1:
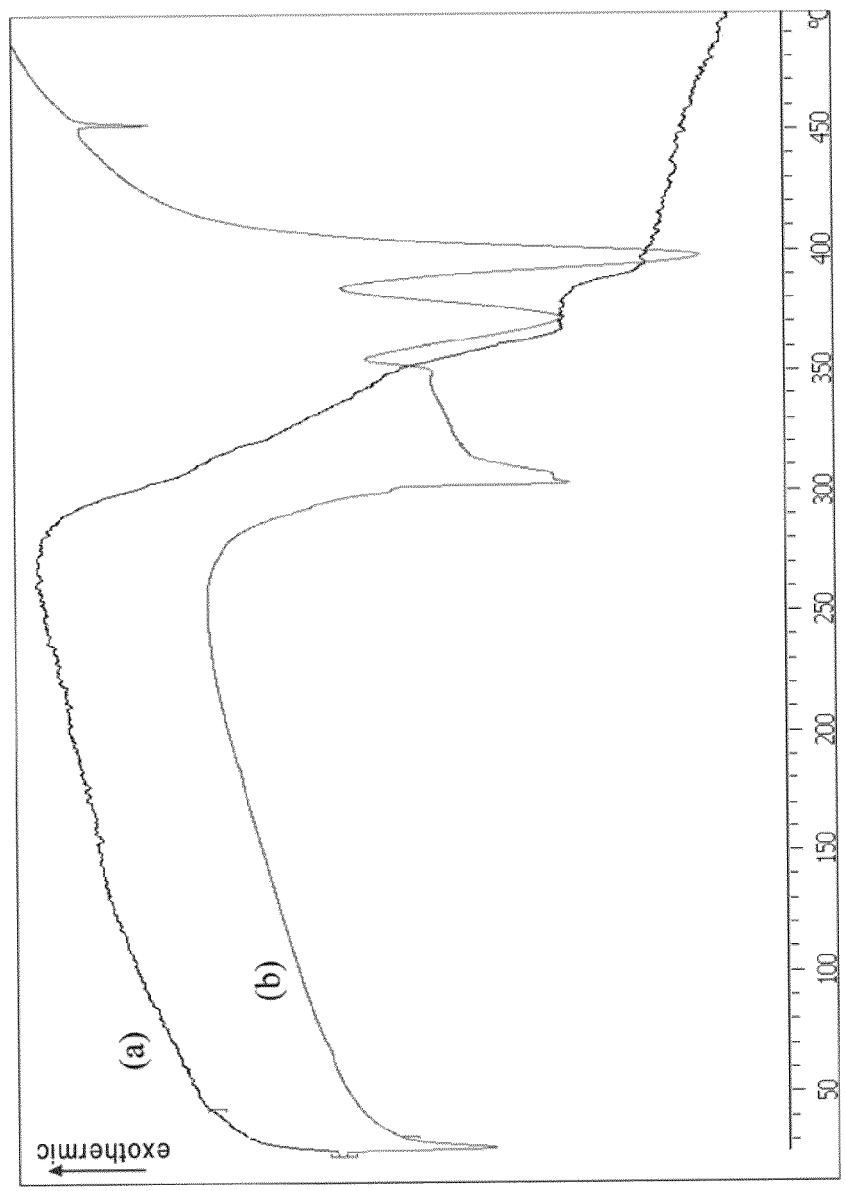
FIG. 1 shows a comparison of (a) a thermogravimetric analysis (TGA) and (b) a differential scanning calorimetry (DSC) spectrum of $MgB_2$ after having been processed under 950 bars (95 MPa) of hydrogen at 400° C. to provide $Mg(BH_4)_2$. Weight loss is seen beginning at about 280° C.

This disclosure describes a new direct solid state route to synthesize $Mg(BH_1)_2$ from a sample of $MgB_2$ according to the reaction formula below:

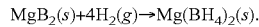

$MgB_2(s)+4H_2(g)\rightarrow Mg(BH_4)_2(s)$.

What is unique with the present approach, however, is that the starting materials are the decomposition products upon release of hydrogen when the synthesized material is again heated. Thus this reaction implies a high-capacity reversible hydrogen storage system.

It has recently been shown that $Mg(BH_4)_2$ decomposes through a series of intermediated species until all hydrogen is released to form $MgB_2$ (see Hwang, et al., op. cit. *Journal of Physical Chemistry C Letters*, 2008, v. 112(9): pp. 3164-3169). We are here preparing $Mg(BH_4)_2$ from its decomposition product in order to show feasibility for application as a reversible storage material with a capacity of 14 wt % hydrogen.

In an initial embodiment of the invention, the synthesis of magnesium borohydride comprised mixing powders of a simple alkaline earth boride (e.g. $MgB_2$) with a small amount of a metal chloride compound (typically $TiCl_3$, $NiCl_2$, or a mixture thereof) which is then ball milled under an inert atmosphere at or near room temperature.

However, we have since found that neither the catalyzing agent nor the milling process is necessary to the formation of the borohydride. That is, the presence of the catalyst does not improve the yield of borohydride that is formed during hydrogenation and that milling is redundant if the starting material is available as a powder. Furthermore, the magnesium boride powder is compacted and formed into pellets as a handling convenience only but is otherwise not necessary.

EXAMPLE

As noted, the powder was placed in a mold assembly at or near room temperature under a high purity atmosphere in an argon filled glove box and pressed into pellet for handling convenience. The pressed pellets were then transferred to a commercial autoclave-type vessel and exposed to high purity (99.999%) hydrogen gas pressurized to several hundred bar and the vessel externally heated. Pressure measurements were taken using a calibrated pressure transducer for the absorption half-cycle and/or a calibrated capacitance manometer for the desorption half-cycle. Data was recorded with a computer By way of example, a small amount of $MgB_2$ (~0.1 mol) powder was transferred into a stainless steel punch-and-die assembly and formed into pellets to provide a convenient means for handling the material. A CARVER LABORATORY PRESS® (obtained from Carver Inc., Wabash, Ind. 46992) was used to compact the powder but any similar bench-type hydraulic press, having a gauge clamping-force of about 1 ton would be equally effective.

Once formed, the pellets were then placed into an AE® Closure Pressure Vessel (manufactured by the AUTOCLAVE ENGINEERS® Fluid Component Division of SNAP-TITE®, Inc., Erie, Pa. 16509) having an internal volume of about 100 $cm^3$. The vessel was sealed, backfilled with high purity (99.999%) hydrogen gas and initially pressurized to 400 bar (40 MPa) and then heated to 350° C., or preferably 400° C., to initiate the desired reaction. When the reaction temperature was reached the hydrogen pressure was further raised to either 700 bar (70 MPa) or 900 bar (90 MPa) and thereafter maintained at these conditions for 108 hours before cooling under pressure.

Pressure measurements were taken by using a calibrated pressure transducer for the absorption half-cycle and a calibrated BARATRON®-type capacitance manometer for the desorption half-cycle. Data was recorded with a computer.

After cooling down, the initially dark brown pellets were partially transformed to a white crystalline product. Rietveld analysis of x-ray data utilizing the program FullProf (available at http://www.ill.eu/sites/fullprof/php/downloads.html) indicates that about 75% is $\beta$-$Mg(BH_4)_2$, and about 15% is unreacted $MgB_2$ plus a small amount of MgO, suggesting that nearly complete hydrogenation has been achieved. The formation of the high temperature phase is in accordance with thermodynamic considerations since the synthesis temperatures are above the 190° C. $\alpha$-$\beta$ phase transition point and once $\beta$-$Mg(BH_4)_2$ is formed it is stable and does not revert to $\alpha$-$Mg(BH_4)_2$ when the temperature is lower.

Differential scanning calorimetry (DSC), thermal gravimetric analysis (TGA) and Fourier transform infrared (FT-IR) spectroscopy were utilized to further identify the reaction products by providing information on phase transitions and weight loss, and absorption bands. These studies provided initial information on phase transitions and weight loss, the latter most likely associated with the release of hydrogen upon decomposition.

Figure 2:
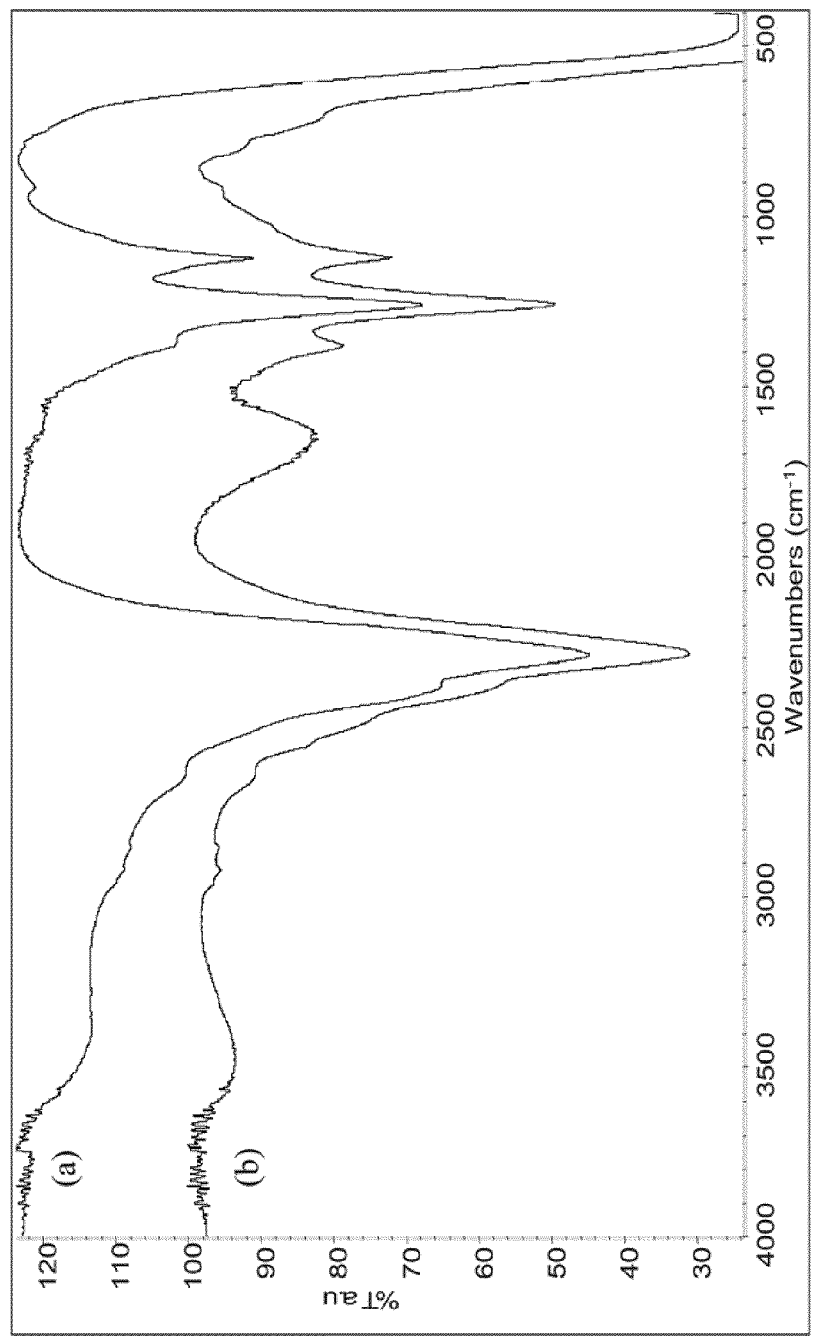
FIG. 2 shows a comparison of Fourier transform infrared (FT-IR) spectra taken of (a) a sample of solvent synthesized $Mg(BH_4)_2$ and (b) $Mg(BH_4)_2$ synthesized from $MgB_2$ after having been processed under 950 bars (95 MPa) of hydrogen at 400° C.

As seen in FIG. 1 the TGA/DSC spectrum was obtained in the 25° C.-500° C. temperature range using a heating rate of 10° C. min$^{-1}$ and an argon flow rate of 20 ml hour$^{-1}$. The spectrum is nearly identical to that obtained for an authentic sample of $Mg(BH_4)_2$ thus confirming that it was the major product of the hydrogenation. Moreover, the FT-IR spectra of the product mixture shown in FIG. 2 matches characteristic absorptions previously observed for $Mg(BH_4)_2$: $BH_2$ bending modes at 1120 cm$^{-1}$ and 1260 cm$^{-1}$; B—H stretch modes at 2280 cm$^{-1}$ and 2380 cm$^{-1}$; and the peak at 1381 cm$^{-1}$ that has been assigned to Mg—H. Additional small features were observed at 1660 cm$^{-1}$ and 2500-2650 cm$^{-1}$ which we attributed to the presence of small amounts of boranes. It should be noted that the features of the DSC and TGA curves are quite similar to that which Chlopek, et at (op. cit. *Journal of Materials Chemistry*, 2007, v. 17(33): pp. 3496-3503) have reported for $Mg(BH_4)_2$.

Previous studies of the hydrogenation of $MgB_2$ at lower pressures have shown that the major product of the reaction is amorphous $MgB_{12}H_{12}$ that is not detected by x-ray analysis. However, $MgB_2H_{12}$ was found to be readily observed by $^{11}B$ magic angle spinning-nuclear magnetic resonance (MAS-NMR) spectroscopy. Thus it was essential to analyze the product mixture from the high pressure hydrogenation by $^{11}B$ MAS-NMR. As is shown in FIGS. 3A and 3B, only one major boron-containing product is observed.

In order to confirm the high levels of conversion of $MgB_2$ to $Mg(BH_4)_2$ that were indicated by the NMR analysis, we monitored the dehydrogenation of several samples of the product using an automated thermal volumetric analyzer (Sievert's type apparatus). The observed dehydrogenation profiles closely match those that have been reported for $Mg(BH_4)_2$. We found that heating through the 280° C.-530° C. temperature range results in the release of 12.8 wt % hydrogen which confirms that >85% levels of hydrogenation are achieved by the high pressure method.

Attempts were made to lower the temperature required for the hydrogenation reaction through catalytic enhancement. However, no change was observed for samples of $MgB_2$ mechanically milled and doped with 2 mol % of a variety of additives including $NiCl_2$, $RuCl_3$, Pd, $FeCl_3$, and $CuCl_2$ and $TiCl_3$.

In summary, we have for the first time, demonstrated the full reversible hydrogenation of $MgB_2$ to $Mg(BH_4)_2$. Thus $Mg(BH_4)_2$ stands as an extremely rare example of a material that releases >12 wt % hydrogen upon heating and can be regenerated through direct hydrogenation. It is not clear at this point if the high-pressure reaction pathway is the same as the low-pressure reaction pathway. The minor amount of $MgB_{12}H_{12}$ that was detected in the current example could represent either a small amount of an un-reacted intermediate in the reaction pathway that predominates at high pressures or a minor side product resulting from the competing, standard low-pressure pathway. However, our results point to the plausibility of a reaction pathway for reversible dehydrogenation of borohydrides that avoid the kinetic pitfalls presented by intermediates such as $(B_{12}H_{12})^{2-}$ thus opening the door to potential hydrogen storage applications.

Therefore, a new method for the preparation of magnesium borohydride has been demonstrated. To the extent necessary to understand or complete the disclosure of the present embodiment of the invention, all publications, patents, and patent applications mentioned herein are expressly incorporated by reference therein to the same extent as though each were individually so incorporated.

Having thus described exemplary embodiments of the present invention, it should be noted by those skilled in the art that the disclosures herein are exemplary only and that various other alternatives, adaptations, and modifications may be made within the scope of the present invention. Accordingly, the present invention is not limited to the specific embodiments as illustrated herein, but is only limited by the following claims.

We claim:

1. A method of producing a magnesium borohydride ($Mg(BH_4)_2$), comprising the step of hydrogenating a quantity of magnesium boride ($MgB_2$) at an elevated temperature and pressure to provide a quantity of $Mg(BH_4)_2$, wherein said step of hydrogenation is performed at a temperature at or above 350° C., and at a hydrogen pressure of at least about 70 MPa.

2. The method according to claim 1, wherein the hydrogen pressure is maintained for at least about 72 hours.

3. The method according to claim 1, wherein the $MgB_2$ is mechanically mixed with a powder of a metal chloride catalyst compound, wherein the metal chloride compound is selected from the list consisting of $TiCl_3$, $NiCl_2$, a mixture of $TiCl_3$ and Pd, and a mixture of $TiCl_3$ and $NiCl_2$.

4. The method according to claim 3, wherein the metal chloride catalyst comprises about 2 to about 8 weight percent of the weight of the $MgB_2$.

5. The method according to claim 3, wherein said step of mechanically mixing comprises a process selected from the group consisting of ball milling, plate or impact grinding, and blending, stirring, or agitating with or without a mechanical aid.

6. The method according to claim 5, wherein said step of mechanically mixing is carried out in an atmosphere consisting essentially of high purity argon gas.

7. The method according to claim 5, wherein said step of mechanically mixing is carried out at about room temperature.

8. The method according to claim 3, wherein the metal chloride catalyst compound comprises an equimolar mixture of $TiCl_3$ and $NiCl_2$.

9. A method for producing a hydrogen storage material having a hydrogen capacity of at least 11 wt % hydrogen upon heating, comprising the step of hydrogenating magnesium boride ($MgB_2$) at an elevated temperature and pressure to provide a quantity of $Mg(BH_4)_2$, wherein said step of hydrogenation is performed at a temperature at or above 350° C., and at a hydrogen pressure of at least about 70 MPa.

10. The method according to claim 9, wherein the hydrogen pressure is maintained for at least about 72 hours.

* * * * *